(12) United States Patent
Lo

(10) Patent No.: US 9,214,102 B2
(45) Date of Patent: Dec. 15, 2015

(54) RAPIDLY RECHARGEABLE WARNING DEVICE

(71) Applicant: TEK MAKER CORPORATION, Neihu Dist., Taipei (TW)

(72) Inventor: Teh-Liang Lo, New Taipei (TW)

(73) Assignee: TEK MAKER CORPORATION, Taipei (TW)

( * ) Notice: Subject to any disclaimer, the term of this patent is extended or adjusted under 35 U.S.C. 154(b) by 100 days.

(21) Appl. No.: 14/053,877

(22) Filed: Oct. 15, 2013

(65) Prior Publication Data

US 2014/0104071 A1    Apr. 17, 2014

(30) Foreign Application Priority Data

Oct. 16, 2012    (TW) .............................. 101138036 A

(51) Int. Cl.

| | |
|---|---|
| *G08B 5/22* | (2006.01) |
| *G09F 13/16* | (2006.01) |
| *B60Q 7/00* | (2006.01) |
| *H02J 7/00* | (2006.01) |
| *H02J 7/34* | (2006.01) |

(52) U.S. Cl.
CPC *G09F 13/16* (2013.01); *B60Q 7/00* (2013.01); *H02J 7/007* (2013.01); *H02J 7/345* (2013.01)

(58) Field of Classification Search
CPC ............. G09F 9/33; G09F 13/16; B60Q 7/00; Y02E 60/13; B60L 11/185

USPC ........... 340/815.45, 463, 464, 468, 471, 473, 340/474; 320/109
See application file for complete search history.

(56) References Cited

U.S. PATENT DOCUMENTS

| 5,115,182 A * | 5/1992 | Ehmke et al. .................. 320/136 |
| 7,408,272 B2 * | 8/2008 | Marquet ......................... 307/48 |
| 2006/0103543 A1* | 5/2006 | Chen et al. ............... 340/815.45 |
| 2009/0096430 A1* | 4/2009 | Van Der Linde et al. ..... 320/166 |
| 2009/0146826 A1* | 6/2009 | Gofman et al. ............ 340/636.2 |

* cited by examiner

*Primary Examiner* — Toan N Pham
(74) *Attorney, Agent, or Firm* — Bacon & Thomas, PLLC

(57) ABSTRACT

The present invention is to provide a rapidly rechargeable warning device, which includes a power receiving element for receiving external electric power, a charging control module for receiving electric power from the power receiving element, a fast energy storage element (e.g., a supercapacitor or any rapidly rechargeable components) being rapidly charged by the charging control module and then outputting electricity stored therein, an warning element (e.g., a light-emitting diode, a buzzer, or a vibrator) capable of issuing a warning signal (e.g., a light signal, a warning sound, or vibrations) upon receiving the electricity outputted by the fast energy storage element. Thus, since the fast energy storage element can be fully charged within a short time through being connected to a cigarette lighter socket of a car, or a transformer connected to an indoor power source, the warning device can be used immediately and effectively prevent user from using one-time batteries.

7 Claims, 5 Drawing Sheets

RAPIDLY RECHARGEABLE WARNING DEVICE

FIELD OF THE INVENTION

The present invention relates to a warning device, more particularly to a rapidly rechargeable warning device, which includes a fast energy storage element (e.g., a supercapacitor or any rapidly rechargeable components) capable of being rapidly charged by a charging control module and then outputting electricity stored therein to a warning element (e.g., a light-emitting diode, a buzzer, or a vibrator) for generating a warning signal (e.g., a light signal, a warning sound, or vibrations). Since the fast energy storage element can be fully charged within a short time through being connected to a cigarette lighter socket of a car, or a transformer connected to an indoor power outlet, the warning device can be used immediately and effectively prevent user from using one-time batteries (which may be unavailable at the moment when needed and will cause environmental pollution inevitably after used).

BACKGROUND OF THE INVENTION

It is common practice to place eye-catching warning devices around a construction site or around a car broken down on the road as an effective alert to drivers and pedestrians passing by. In addition to bright orange traffic cones, some common examples of such warning devices are warning triangles, reflective plates, and reflective safety vests. Take warning triangles for instance. Commercially available warning triangles are provided with reflective plates for reflecting light projected from an approaching car. At night or dusk, however, the conventional warning triangles, which cannot emit light on their own, become less conspicuous and hence less effective in preventing accidents from happening.

As an improvement over the aforesaid prior art, warning devices capable of making sound or emitting light were developed. According to research and observation by the inventor of the present invention, these improved warning devices—be they warning triangles, traffic batons, or warning lights—are mostly powered by one-time batteries, though in some cases rechargeable batteries are used instead as the power source of light-emitting diodes or buzzers in the warning devices.

It is understood that the (stored) energy of a one-time battery or a rechargeable battery (hereinafter referred to collectively as a battery) will, by nature, be gradually released and lost. Therefore, a spare battery which has never been used will eventually lose at least some of its energy. If the batteries of a warning device happen to be dead or have insufficient electricity in case of an emergency, new batteries must be purchased, which not only costs extra money but also, when one-time batteries are used in large quantities, leads to a waste of resources and pollution, not to mention the untimeliness of the purchase, considering only the urgency of the situation. Moreover, it is practically impossible to buy new batteries if the emergency takes place in a mountainous area or a remote suburb or on the highway. Should attempts be made to charge the batteries of the warning device, the charging process is so time-consuming that the warning device may still be short of electricity and incapable of providing warning when needed; consequently, accidents may follow.

The issue to be addressed by the present invention is to solve the various problems of the conventional warning devices and provide a warning device with a fast energy storage element which can be fully charged within a short time. Thus, pollution as well as a waste of resources which may otherwise result from excessive use of one-time batteries can be prevented, and warning devices can be used in a more timely and convenient manner than the prior art counterparts.

BRIEF SUMMARY OF THE INVENTION

In light of the various problems of the conventional warning devices during use, the inventor of the present invention conducted extensive research and finally succeeded in developing a rapidly rechargeable warning device in which a fast energy storage element can be fully charged within a short time. Thus, the timeliness and convenience in utilizing the warning device are effectively enhanced, and excessive use of one-time batteries is avoided to the advantage of environmental protection.

It is an object of the present invention to provide a rapidly rechargeable warning device (e.g., a warning triangle, a traffic baton, a warning light, a warning sign, or a light-emitting safety vest) which includes a housing, a power receiving element, a charging control module, a fast energy storage element, and a warning element. The power receiving element is provided on the housing and is configured for connecting with a power cord or a transformer so as to connect to an external power source (e.g., the cigarette lighter socket of a car or an indoor power outlet) through the power cord or the transformer. The charging control module is received in the housing and is connected to the power receiving element so as to receive external electric power and control charging of the fast energy storage element. The fast energy storage element (e.g., a supercapacitor or any rapidly rechargeable components) is received in the housing and is connected to the charging control module. The fast energy storage element is configured for storing electricity and for providing output electricity when discharged. The warning element (e.g., a light-emitting diode, a buzzer, or a vibrator) is connected to the fast energy storage element and can generate a warning signal (e.g., a light signal, a warning sound, or vibrations) upon receiving the output electricity. The technical features of the present invention are such that the fast energy storage element of the rapidly rechargeable warning device can be rapidly charged through the cigarette lighter socket of a car, which socket is connected to a power source of the car, or through a transformer connected to an indoor power outlet. Thus, the money otherwise required for buying one-time batteries can be saved, and the user does not have to wait a long time for the charging operation of the rechargeable batteries to complete. The present invention not only significantly increases the timeliness and convenience in utilizing the warning devices, but also prevents pollution and a waste of resources which may otherwise result from using one-time batteries in large quantities.

Another object of the present invention is to provide the foregoing warning device, wherein the warning device further includes a voltage boosting module received in the housing and connected to the fast energy storage element. When the fast energy storage element is discharged, the voltage boosting module receives, and then increases the voltage level of the output electricity of the fast energy storage element, so as to provide the voltage required by the warning element to generate the warning signal.

Still another object of the present invention is to provide the foregoing warning device, wherein the warning device further includes an output control module connected between the voltage boosting module and the warning element. The output control module is configured for adjusting the current and voltage to be outputted to the warning element as well as the output frequency, so as for the warning element to generate various warning signals.

BRIEF DESCRIPTION OF THE SEVERAL VIEWS OF THE DRAWINGS

The structure and advantages of the present invention will be best understood by referring to the following detailed description of some illustrative embodiments in conjunction with the accompanying drawings, in which.

DETAILED DESCRIPTION OF THE INVENTION

Figure 1:
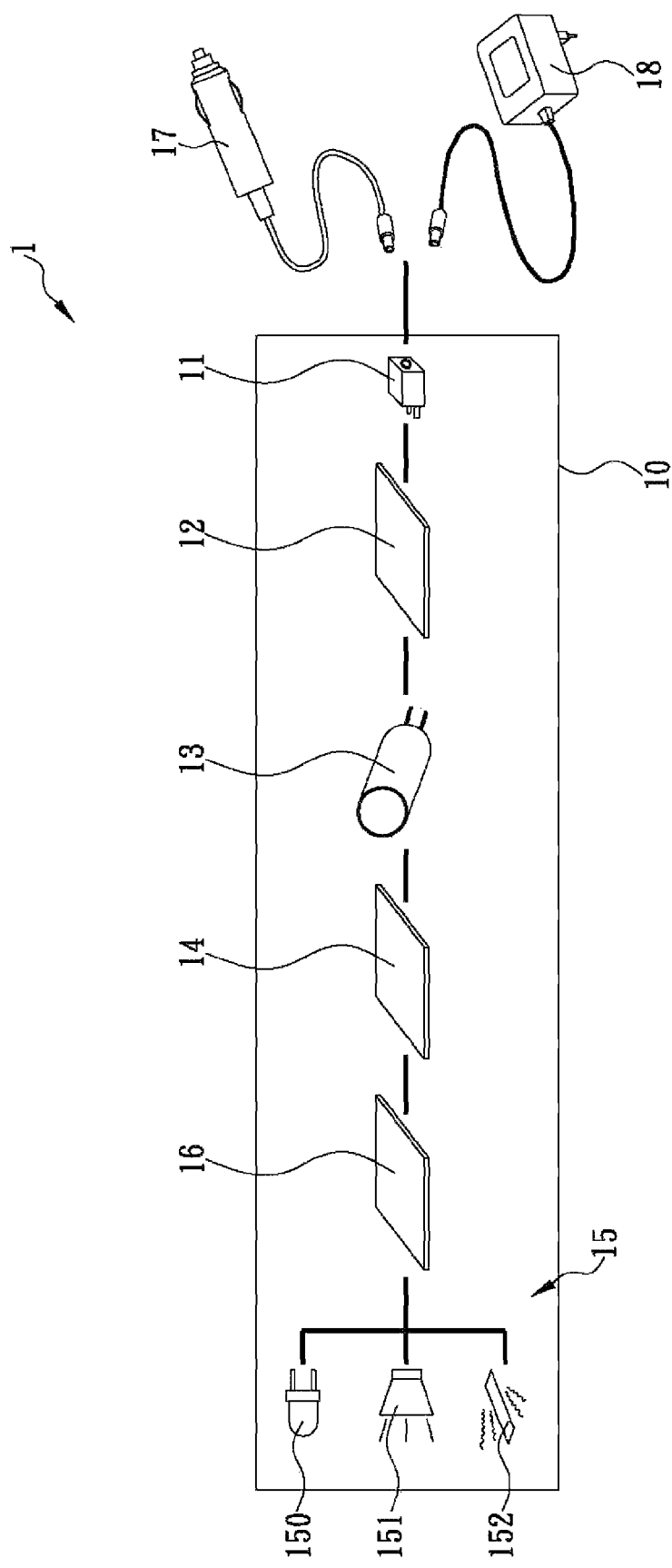
FIG. 1 is a schematic structural diagram of the elements of the present invention.

The conventional warning devices can not emit but reflect the light. Those improved and powered by batteries often suffer from loss of battery power, thus requiring users to spend extra money on one-time batteries for replacement. Aside from the inconvenience of frequent battery replacement, the massive use of one-time batteries is a waste of resources and causes pollution. Even if a warning device is powered by a rechargeable battery, the fact that rechargeable batteries nowadays are not designed to be rapidly charged with a large current leads to a time-consuming charging process that is of little help in case of emergency. In consideration of this, the inventor came up with the idea of equipping a warning device with a fast energy storage element which allows the warning device to be fully charged within a short time. Hence, a waste of resources and pollution can be prevented while the timeliness and convenience in utilizing the warning device are effectively increased.

The present invention discloses a rapidly rechargeable warning device. Please refer to FIG. 1 for a schematic structural diagram of the elements of the present invention. The warning device 1 shown in FIG. 1 includes a housing 10, a power receiving element 11, a charging control module 12, a fast energy storage element 13, a voltage boosting module 14, a warning element 15, and an output control module 16. The power receiving element 11, which is provided on the housing 10, is configured for connecting with a power cord 17 or a transformer 18 and thereby connecting to an external power source (e.g., the cigarette lighter socket of a car or an indoor power outlet). In practice, it is also feasible for the power cord 17 or the transformer 18 to be directly fixedly connected to the power receiving element 11. The charging control module 12 is received in the housing 10 and is connected to both the power receiving element 11 and the fast energy storage element 13, so as to receive electricity from the external power source and charge the fast energy storage element 13. The charging control module 12 can adjust the charging voltage and current while detecting the voltage of the fast energy storage element 13 and stop charging once the voltage of the fast energy storage element 13 reaches a predetermined voltage level. For example, assume the fast energy storage element 13 is a supercapacitor whose capacity equals to 3 volts (V)×100 Farads (F), the voltage across which is brought to 3 V by a voltage divider circuit, and on which fast charging is performed with a 10-ampre (A) current. When the voltage of the fast energy storage element 13 is detected to have reached 3 V, the charging control module 12 cuts off the electricity transmitted from the external power source and thereby stops charging the fast energy storage element 13. The fast energy storage element 13 is received in the housing 10 and can receive and store the electricity transmitted from the charging control module 12. When discharged, the fast energy storage element 13 provides output electricity.

Referring to FIG. 1, the fast energy storage element 13 in the present invention can be a supercapacitor or any kind of energy storage components that can be recharged with large current. A so-called supercapacitor—also known as golden capacitor, or double-electric layer capacitor—is an electrochemical capacitor of high energy density, as disclosed in further detail below with reference to the aforesaid example in which the fast energy storage element 13 is a supercapacitor having a capacity of 3 V×100 F. When the fast energy storage element 13 is charged with a current of 10 A, the required charging time can be determined as follows. The energy that the supercapacitor can store when fully charged is $W=\frac{1}{2} \times C \times V^2 = \frac{1}{2} \times 100 \times 3^2 = 450$ joules (J), where C and V are the capacitance and voltage of the fast energy storage element 13 respectively. Then, the time required for charging with the 10-A current can be obtained from $\int I \times V(t) dt \approx I \times \Delta V \times t = 10 \times 1.5 \times t = 450$ J, where t is the charging time, I is the charging current, V(t) is the voltage across the supercapacitor, and $\Delta V$ is the average voltage drop during the charging process. The charging time t thus obtained is 30 seconds, meaning that it takes only about 30 seconds to fully charge the 100-F supercapacitor.

Referring again to FIG. 1, the voltage boosting module 14 is received in the housing 10 and is connected to the fast energy storage element 13. When the fast energy storage element 13 is discharged, the voltage boosting module 14 receives the output electricity of the fast energy storage element 13 and increases the level value of the output electricity. Assume the fast energy storage element 13 is a 3-V supercapacitor outputting to a load of 2 V. When the voltage of the fast energy storage element 13 is lower than 2 V, the fast energy storage element 13 can no longer drive the load, despite the electricity remaining in the fast energy storage element 13. By means of the voltage boosting module 14, the lower-than-2 V voltage of the energy remaining in the fast energy storage element 13 can be raised above 3 V, allowing the fast energy storage element 13 to continue outputting to the load. In other embodiments of the present invention, the voltage boosting module 14 may be dispensed with such that the fast energy storage element 13 supplies electricity directly to the warning element 15 (i.e., the load). In that case, the unusable electricity left in the fast energy storage element 13 will be more than when the voltage boosting module 14 is present.

Figure 2:
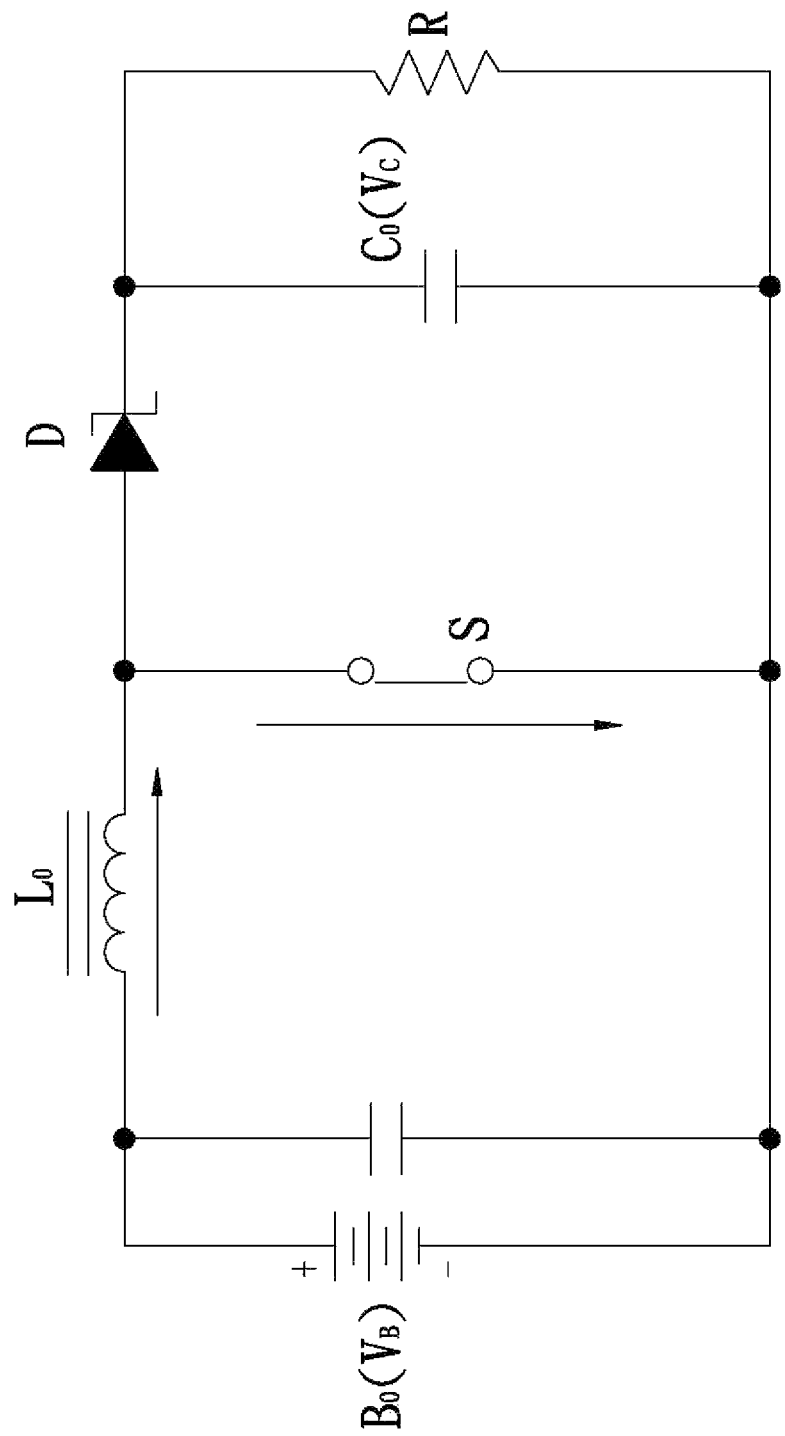
FIG. 2 is a circuit diagram of the voltage boosting module in the present invention.
Figure 3:
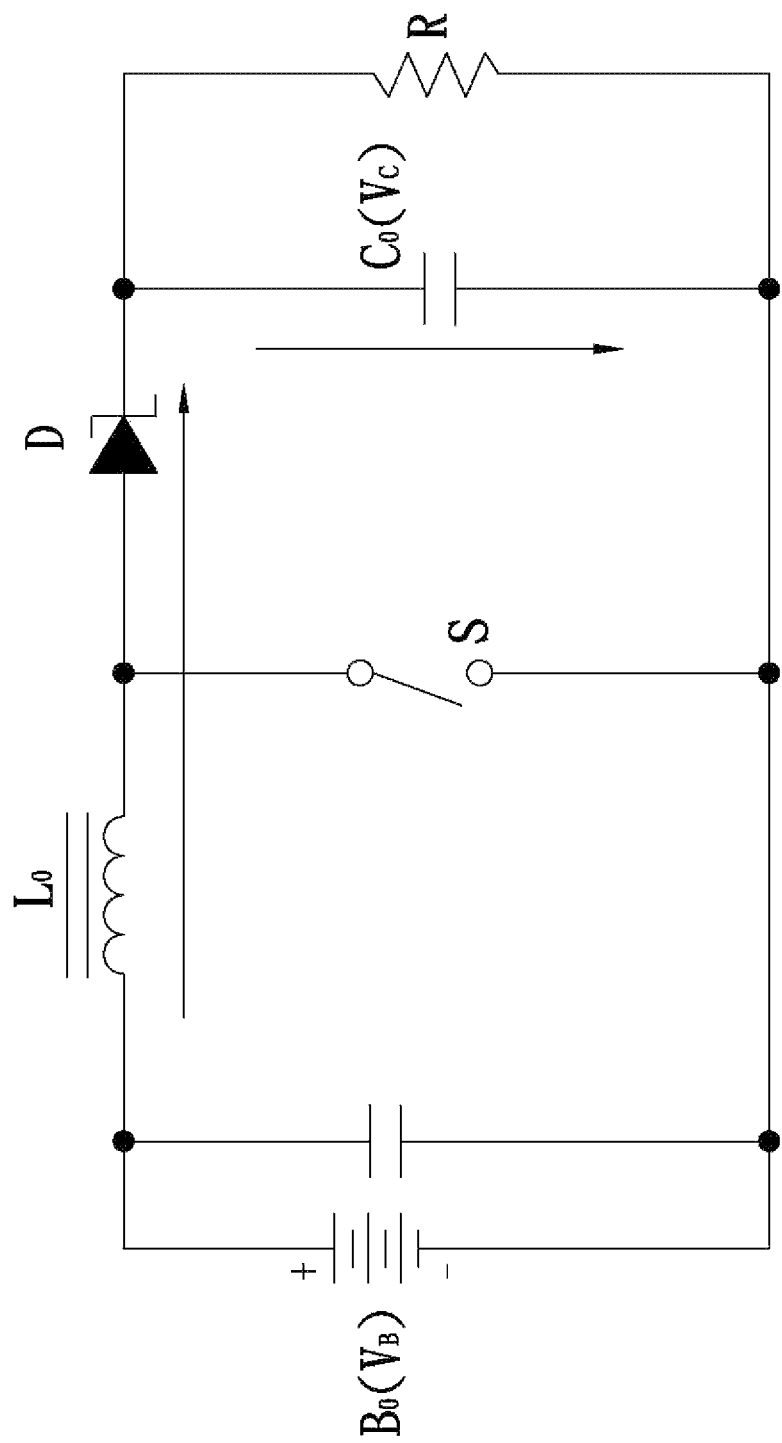
FIG. 3 is another circuit diagram of the voltage boosting module in the present invention.

Please refer to FIGS. 2 and 3 in conjunction with FIG. 1, wherein FIGS. 2 and 3 show a common example of the circuitry of the voltage boosting module 14. The voltage boosting module 14 includes an energy storage element $B_0$, an inductor $L_0$, a diode D, a switch S, and an output capacitor $C_0$. The inductor $L_0$ has one end connected to one end of the switch S and the anode of the diode D, and the other end connected to the positive end of the energy storage element $B_0$. The cathode of the diode D is connected to one end of the output capacitor $C_0$. The output capacitor $C_0$ is connected to a load R in parallel. The other end of the switch S is connected to the other end of the output capacitor $C_0$ and the negative end of the energy storage element $B_0$. In FIG. 2, in which the switch S is closed (i.e., turned on), the voltage $V_B$ of the energy storage element $B_0$ flows through the inductor $L_0$; as a result, electric energy $W_L$ is stored in the inductor $L_0$ ($W_L = \frac{1}{2} \times L \times I^2$, where L is the inductance of the inductor $L_0$, and I is the current through the inductor $L_0$). Referring to FIG. 3, when the switch S is opened (i.e., turned off), the energy storage element $B_0$ charges the output capacitor $C_0$ such that the capacitor $C_0$ stores electric energy $W_0$ ($W_0 = \frac{1}{2} \times C \times V_B^2$, where C is the capacitance of the capacitor $C_0$, and $V_B$ is the voltage of the energy storage element $B_0$). In the meantime, the inductor $L_0$ charges the output capacitor $C_0$, too. Therefore, the electric energy of the output capacitor $C_0$ will be $W_C = \frac{1}{2} \times C \times V_C^2 = \frac{1}{2} \times C \times V_B^2 + \frac{1}{2} \times L \times I^2$, in which the voltage $V_C$ of the capacitor $C_0$ can be derived from $V_C^2 = V_B^2 + L/C \times I^2$. Now that the energy storage element $B_0$ and the inductor $L_0$ charge the capacitor $C_0$ simultaneously, the voltage $V_C$ of the capacitor $C_0$ becomes higher than the voltage $V_B$ of the energy storage element $B_0$, and a voltage boosting effect is thus achieved.

Referring again to FIG. 1, the output control module 16 of the warning device 1 is received in the housing 10 and is connected to the voltage boosting module 14 so as to receive the output electricity of the voltage boosting module 14. The output control module 16 is also connected to the warning element 15 so as to transmit electricity to and control the operation of the warning element 15. For example, when the warning element 15 is a light-emitting diode, the output control module 16 may be configured to adjust its output voltage and current to the warning element 15, as well as the output frequency and time, thus enabling various warning signal modes of the warning element 15, e.g., causing the warning element 15 to flash intermittently, rapidly, cyclically, at varying speeds, or continuously. In a different embodiment of the present invention where the output control module 16 is omitted, the warning element 15 is directly connected to the voltage boosting module 14 and therefore has only one warning signal mode. Furthermore, the warning element 15 may be a buzzer 151 or a vibrator 152, instead of the light-emitting diode 150. In short, the output control module 16, if present, can deliver the boosted output electricity of the voltage boosting module 14 to the warning element 15 and switch the warning signal modes thereof, for example by changing the flashing frequency of a light signal, the decibel level and frequency of a warning sound, or the frequency and the number of times of vibrations.

Figure 4:
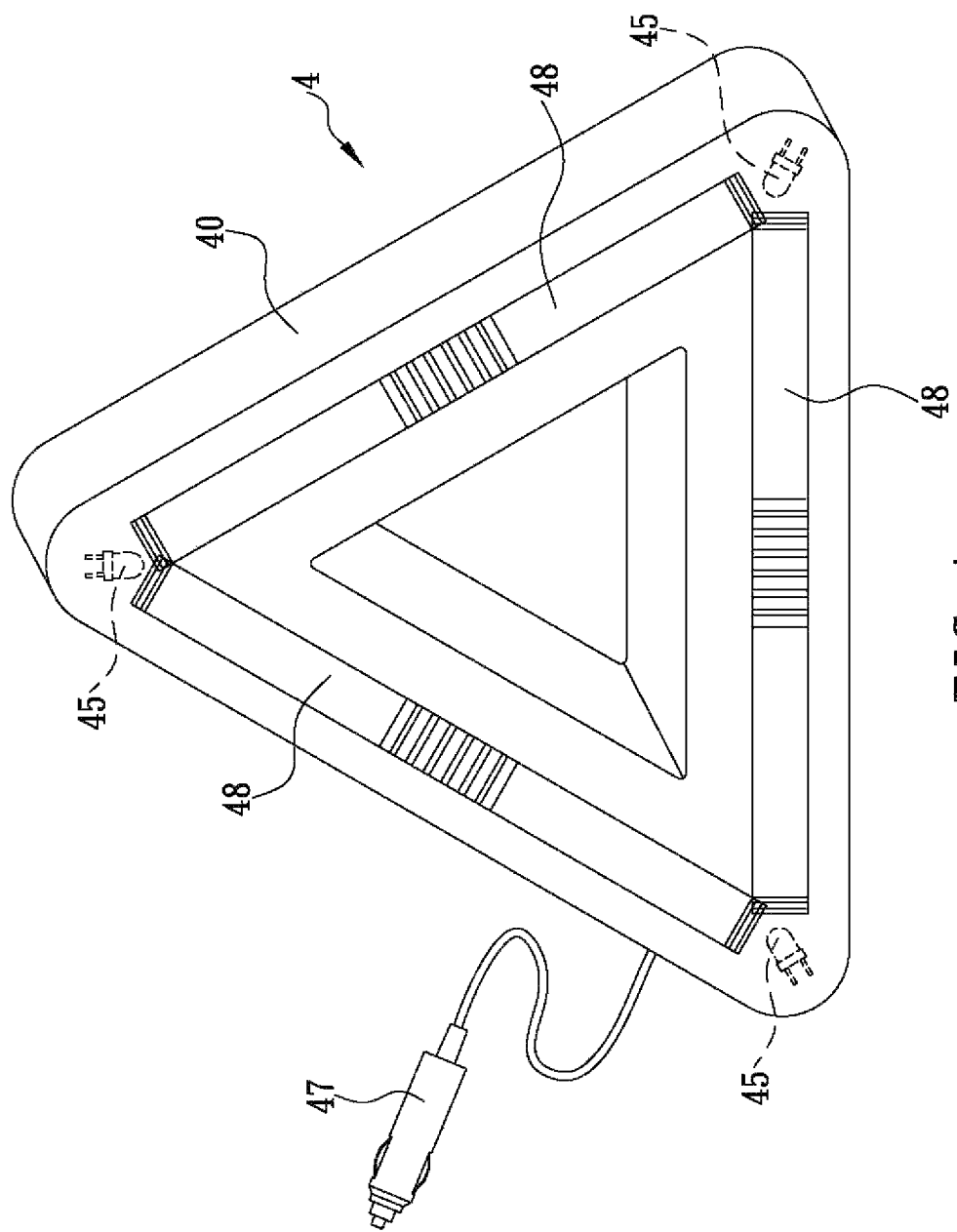
FIG. 4 is a perspective view of the first preferred embodiment of the present invention.

In the first preferred embodiment of the present invention as shown in FIG. 4, the warning device 4 is implemented as a warning triangle. For the sake of simplicity, FIG. 4 shows only the housing 40 and the warning elements 45 of the warning device 4, leaving out the charging control module, the fast energy storage element, and the voltage boosting module. In the first preferred embodiment, the warning elements 45 are light-emitting diodes, and the housing 40 of the warning device 4 is provided with at least one light guide element 48 corresponding in position to the warning elements 45 (with three light guide elements 48 shown in FIG. 4). The light guide elements 48 may be a light guide plate, light strip, light pipe or light bar, or blended with a light diffusing material which can evenly scatter the light emitted by the warning elements 45. Further, the power receiving element (not shown) of the warning device 4 and the power cord 47 may be integrated as a single unit, e.g., as a plug of an automobile power cord. In that case, the plug may be received in the housing 40 when not in use and is connected to the cigarette lighter socket of a car during the charging process in order to receive electricity from a power source of the car.

Figure 5:
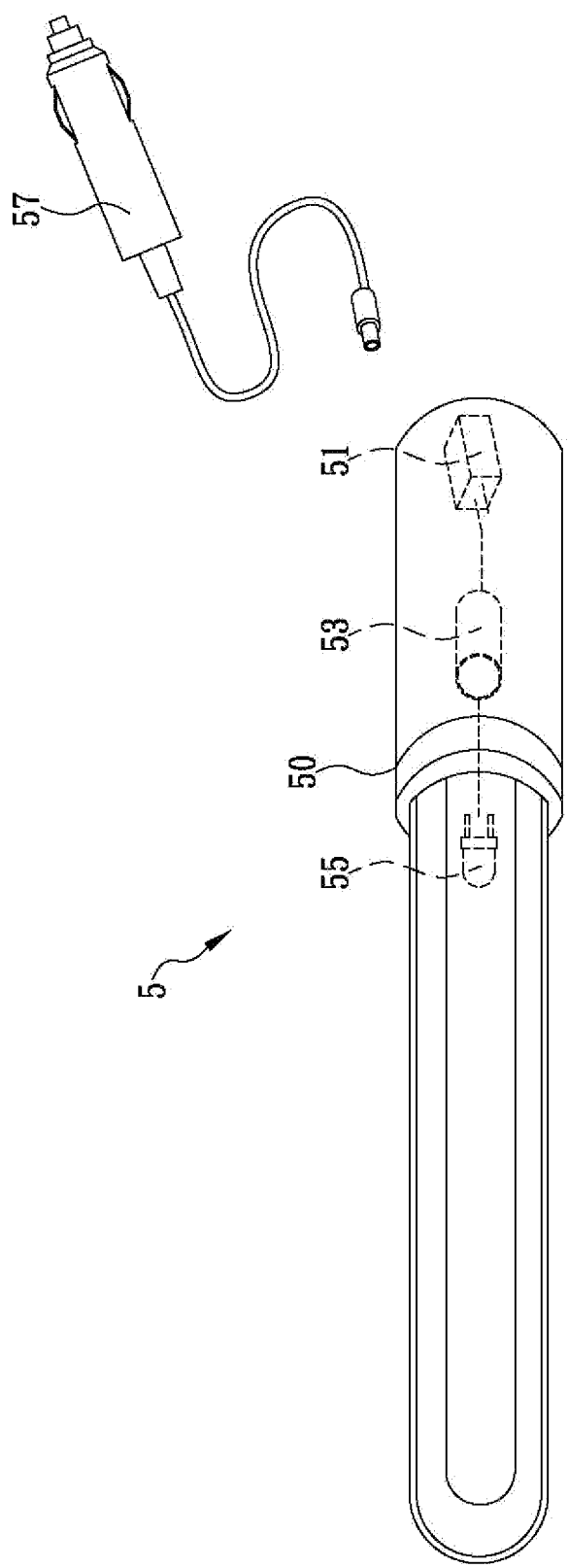
FIG. 5 is a perspective view of the second preferred embodiment of the present invention.

Please refer to FIG. 5 for the second preferred embodiment of the present invention. The warning device 5 is a traffic baton, whose charging control module and voltage boosting module are not shown in the drawing. FIG. 5 shows only the housing 50, the power receiving element 51, the fast energy storage element 53, and the warning element 55 of the warning device 5, without the wiring therebetween. As in the first preferred embodiment, the warning device 5 can be connected to the cigarette lighter socket of a car through an automobile power cord (i.e., the power cord 57) in order to receive electricity from a power outlet of the car. In addition, the warning device 5 can be connected to an indoor power source through a transformer and receive electricity from the indoor power source. Apart from the two warning devices demonstrated in the first and the second preferred embodiments, the technical features of the present invention are equally applicable to warning lights, warning signs, indication signs, light-emitting safety helmets, light-emitting safety vests, and so forth.

Referring back to FIG. 1, when the warning device 1 is needed for use in an emergency, the technical features of the present invention allow the fast energy storage element 13 in the warning device 1 to be rapidly charged from an external power source through the cigarette lighter socket of a car or an indoor power outlet. Thus, the need to buy one-time batteries is eliminated, and the charging process can be completed in a short time. The present invention greatly increases the timeliness and convenience in utilizing the warning device 1 while preventing pollution and a wasteful use of resources. It should be pointed out that the voltage boosting module 14 and/or the output control module 16 may be dispensed with or replaced by other electronic elements or circuits, and yet the intended effects of the present invention are still achievable to some extent. Therefore, all variations and modifications readily conceivable by a person skilled in the art should be viewed as equivalent changes of the present invention and encompassed by the appended claims.

What is claimed is:

1. A rapidly rechargeable warning device, comprising:
    a housing;
    a power receiving element provided on the housing and connectable with a power cord or a transformer so as to connect to an external power source;
    a charging control module received in the housing and connected to the power receiving element;
    a fast energy storage element received in the housing and connected to the charging control module so as to be charged under control of the charging control module, wherein the fast energy storage element is configured for storing electricity and, when discharged, providing output electricity;
    an output control module for adjusting an operating current, a frequency and an output time of the output electricity of the fast energy storage element individually or collectively; and
    a warning element for receiving the output electricity adjusted by the output control module, thereby changing a warning signal mode thereof and generating a warning signal corresponding to the output electricity adjusted by the output control module.

2. The warning device of claim 1, wherein the warning element is a light-emitting diode.

3. The warning device of claim 2, wherein the housing is provided with at least a light guide element corresponding in position to the warning element.

4. The warning device of claim 1, wherein the warning element is a buzzer.

5. The warning device of claim 1, wherein the warning element is a vibrator.

6. The warning device of claim 1, wherein the power cord is a plug of an automobile power cord and is integrated with the power receiving element.

7. The warning device of claim 1, further comprising a voltage boosting module for receiving the output electricity of the fast energy storage element, then increasing a voltage level of the received electricity, and supplying the electricity having an increased voltage level to the warning element.

\* \* \* \* \*